United States Patent
Perrier et al.

(10) Patent No.: US 6,513,941 B1
(45) Date of Patent: Feb. 4, 2003

(54) LIGHTING STAGE

(75) Inventors: Gregory T. Perrier, London (CA); Gerald C. Henderson, London (CA); Jason Hartog, London (CA); Cornelius T. Nieuwland, Thorndale (CA); Daniel Vukmirovich, Macomb, MI (US)

(73) Assignee: Autodata Solutions Company (CA)

( * ) Notice: Subject to any disclaimer, the term of this patent is extended or adjusted under 35 U.S.C. 154(b) by 0 days.

(21) Appl. No.: 09/612,873

(22) Filed: Jul. 10, 2000

(Under 37 CFR 1.47)

(51) Int. Cl.⁷ .............................................. G03B 15/02
(52) U.S. Cl. .......................................... 362/11; 362/17
(58) Field of Search ................. 362/1, 2, 4, 5, 362/11, 17, 18, 250, 277, 418; 396/1, 2, 4, 5, 3

(56) References Cited

U.S. PATENT DOCUMENTS

| | | | |
|---|---|---|---|
| 1,447,475 A | * 3/1923 | Jones | ............................ 396/3 |
| 5,383,099 A | * 1/1995 | Peters | ........................... 362/18 |
| 5,704,702 A | * 1/1998 | Goto | ............................ 362/11 |
| 5,758,196 A | * 5/1998 | Laing | .............................. 396/1 |
| 5,778,258 A | * 7/1998 | Zamoyski | ....................... 396/2 |
| 5,825,651 A | 10/1998 | Gupta et al. | ............ 364/468.09 |
| 6,106,124 A | * 8/2000 | Tarsia | ........................... 362/11 |

* cited by examiner

Primary Examiner—Sandra O'Shea
Assistant Examiner—Peggy A. Neils
(74) Attorney, Agent, or Firm—Piper Rudnick

(57) ABSTRACT

A lighting stage comprising a floor and a turntable located on the floor and operable to rotate about a substantially vertical axis. The turntable has an upper surface to support an object, such as a vehicle, with a ceiling juxtaposed with and spaced from the upper surface. The ceiling has a downwardly directed reflective surface that extends laterally beyond the turntable. A peripheral wall extends from the ceiling to encompass at least a portion of the turntable and has an upper reflective portion and a lower absorbent portion. The upper portion and the ceiling smoothly merge to provide a continuously curved cove to provide the transition between the ceiling and the peripheral wall. A lighting assembly projects light on to the ceiling so that the ceiling and upper portion reflect and diffuse light towards the upper surface of the turntable to illuminate the object that is on the turntable.

17 Claims, 4 Drawing Sheets

LIGHTING STAGE

BACKGROUND OF THE INVENTION

Advertising and promotional material require a high quality photograph of the product being marketed to project the correct image of the product. For this reason significant care is taken in the production of photographs, and in particular to the lighting of the object so that its features are clearly discernible and are presented in the most attractive manner.

One area that is particularly susceptible to the correct use of lighting is in the automobile area where the complex contours of a vehicle and the highly reflective surfaces require great care to ensure that the characteristics of the vehicle are properly displayed. Conventionally it has been appropriate to take single photographs of a vehicle from a particular position for use in brochures and catalogues. More recently, however, the use of the internet to display a vehicle on a manufacturer's or dealer's web site has required a series of photographs that simulate the movement of the viewer around the vehicle. The simulation of the movement around the vehicle can be achieved either by positioning the camera at different positions around the vehicle or, more conveniently, by having the vehicle rotate on a turntable to be photographed from a fixed position. The set of photographs obtained are then displayed successively to simulate rotation. In either case, it is necessary to ensure that the lighting on the vehicle is appropriate at all positions and ensure that the features of the vehicle are properly and consistently shown.

In one known arrangement, a light box is positioned above the vehicle as it is rotated on a turntable. However, the positioning of the light box and the rotation of the vehicle relative to the light box causes the highlighting of the upper surfaces of the vehicle to fluctuate as it rotates. The variations in the highlighting are apparent and relatively unattractive. Moreover, the light box is relatively expensive and its elevated position presents difficulties in supplying the power and controls for the lighting equipment.

There is, therefore, a need for a lighting stage in which the above disadvantages are obviated or mitigated.

SUMMARY OF THE INVENTION

In accordance with one aspect of the present invention there is provided a lighting stage comprising a floor and a turntable located on the floor and operable to rotate about a substantially vertical axis. The turntable has an upper surface to support an object, such as a vehicle, with a ceiling juxtaposed with and spaced from the upper surface. The ceiling has a downwardly directed reflective surface that extends laterally beyond the turntable. A peripheral wall extends from the ceiling to encompass at least a portion of the turntable and has an upper reflective portion and a lower absorbent portion. The upper portion and the ceiling smoothly merge to provide a continuously curved cove to provide the transition between the ceiling and the peripheral wall. A lighting assembly projects light on to the ceiling so that the ceiling and upper portion reflect and diffuse light towards the upper surface of the turntable to illuminate the object that is on the turntable.

Preferably the cove is part spherical and is centred on the axis of rotation of the turntable.

BRIEF DESCRIPTION OF THE DRAWINGS

Embodiments of the invention will now be described by way of example only, with reference to the accompanying drawings in which.

DETAILED DESCRIPTION OF THE PREFERRED EMBODIMENT

Figure 1:
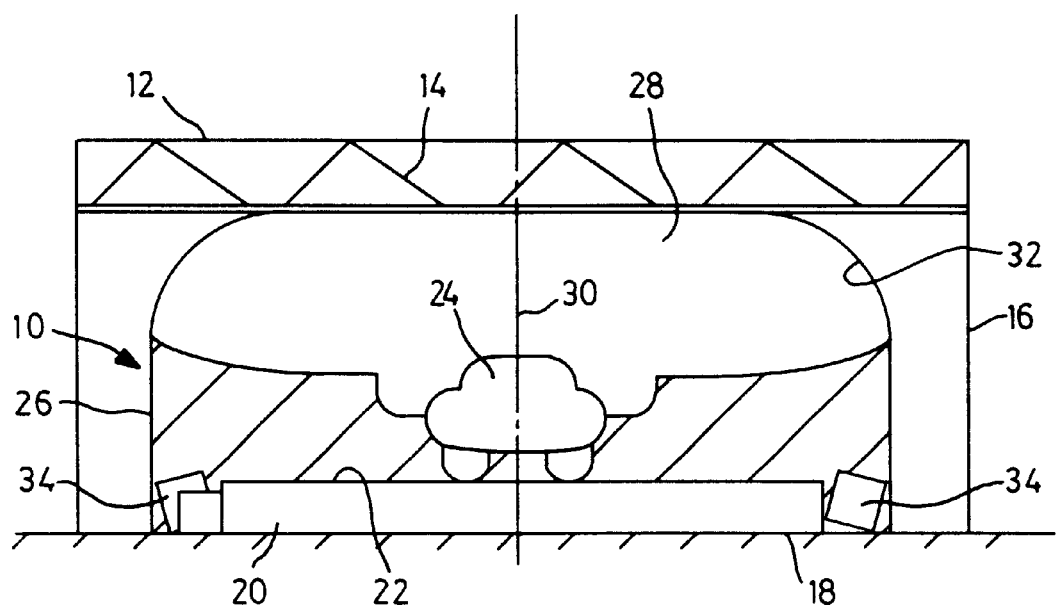
FIG. 1 is section through a lighting stage.

Referring, therefore, to FIG. 1, a lighting stage 10 is located within a studio building 12 that is used to support structurally the lighting stage 10 as necessary. The studio 12 has a roof beam 14 supported on side walls 16 and a floor 18, all of which are of conventional construction.

The sound stage 10 includes a turntable 20 supported on the floor 18, and having an upper surface 22 to support an object indicated at 24 that is to be photographed. The turntable is secured to the floor 18 and is rotatable about a generally vertical axis 30.

Figure 2:
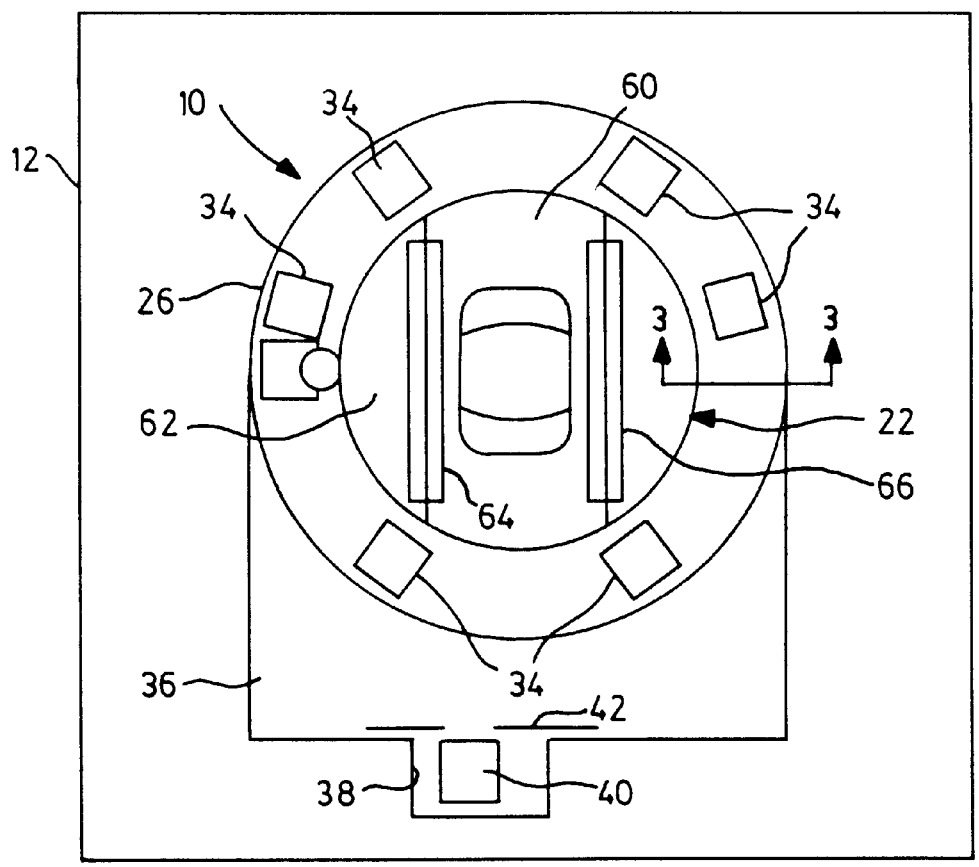
FIG. 2 is a plan-view of the lighting stage shown in FIG. 1.

The turntable 20 is located within a peripheral wall 26 that extends between the floor 18 and a ceiling 28. The ceiling 28 extends laterally beyond the turntable 20 and, as can best be seen in FIG. 2, is circular in plan. The ceiling 28 is centred on the axis of rotation 30 of the turntable and the marginal portions of the ceiling 28 are formed as a curved cove 32.

In the preferred embodiment the cove 32 is part spherical with its centre of curvature at the intersection of the axis 30 with the upper surface 22 of the turntable 20. The cove 32 provides a smooth uniform transition between the plane of central portion of ceiling 28 and the upper edge of the peripheral wall 26 to avoid any sharp edges.

A lighting assembly is provided by a plurality of lights 34 that are disposed about the turntable 20 and are directed inwardly and upwardly to impinge upon the ceiling 28 and cove 32.

As can be seen from FIG. 2 the peripheral wall 26 encompasses a portion of the turntable 20 and is spaced a constant distance from the periphery of the turntable 20. The wall 26 projects forwardly from the turntable 20, as indicated at 36, and provides an enclosure at 38 for a camera 40. The enclosure 38 has a pair of blinds 42 that may be drawn across the front of the enclosure 38 leaving an aperture for the lens of the camera 40 when in use.

Figure 3:
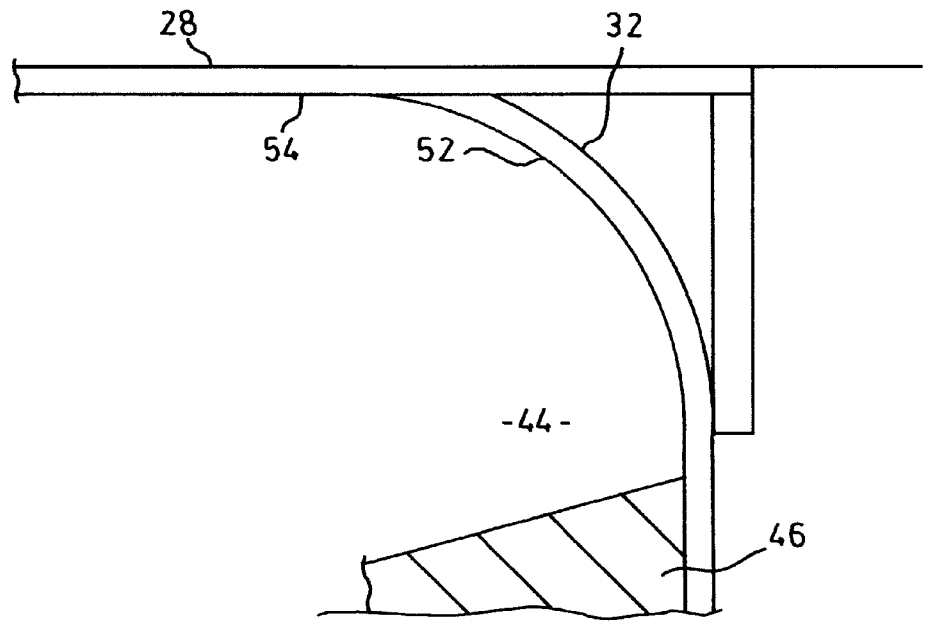
FIG. 3 is a view on the line 3—3 of FIG. 2 on an enlarged scale.
Figure 4:
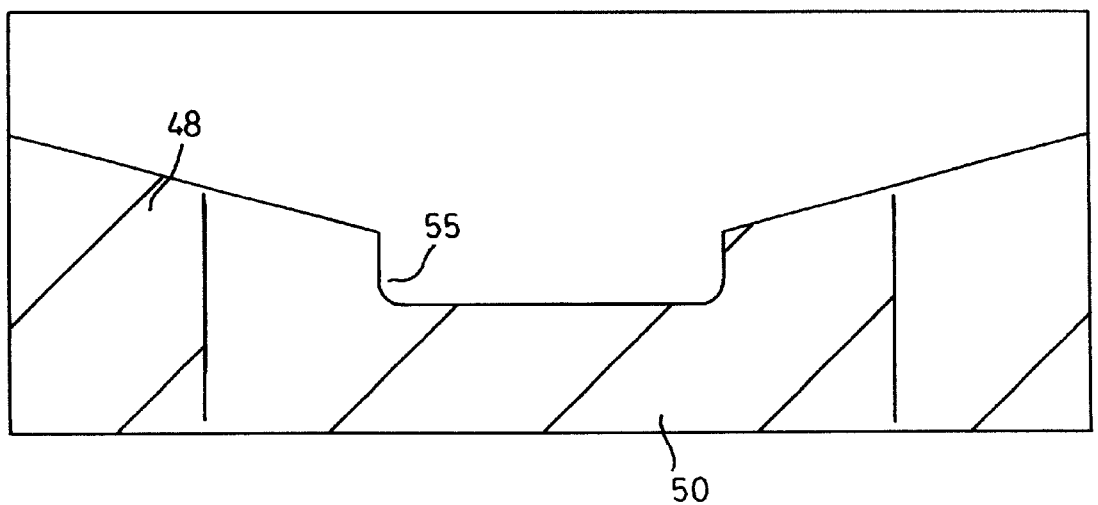
FIG. 4 is a development of a peripheral wall shown in the plan-view of FIG. 2.

Referring to FIGS. 3 and 4, the wall 26 is subdivided into an upper portion 44 and a lower portion 46. The demarcation between upper and lower portions 44,46 provided by coatings of contrasting reflectivity so that the upper portion 44 is finished with a reflective flat paint, such as a white paint, and the lower portion 46 is finished with an absorbent coating 48,50. The coating 48 which is provided on the forward extension 36 of the peripheral wall 26 is provided by a flat black paint and the finish 50 which extends around the turntable 20 is formed from a black absorbent material such as a short pile carpet. The inwardly directed surface 52 of the cove 32 and the downwardly directed surface 54 of the ceiling 28 are similarly finished in a reflective flat white paint that is the same as the finish on the upper portion 44. It will be seen from FIG. 4 that the demarcation between the upper and lower portions 44,46 extends downwardly from either extremity along an inclined line 56 to a central well 58 in which the lower portion 46 is of reduced height. The well 58 is positioned on the peripheral wall 26 so as to be diametrically opposed to the camera 40.

Figure 5:
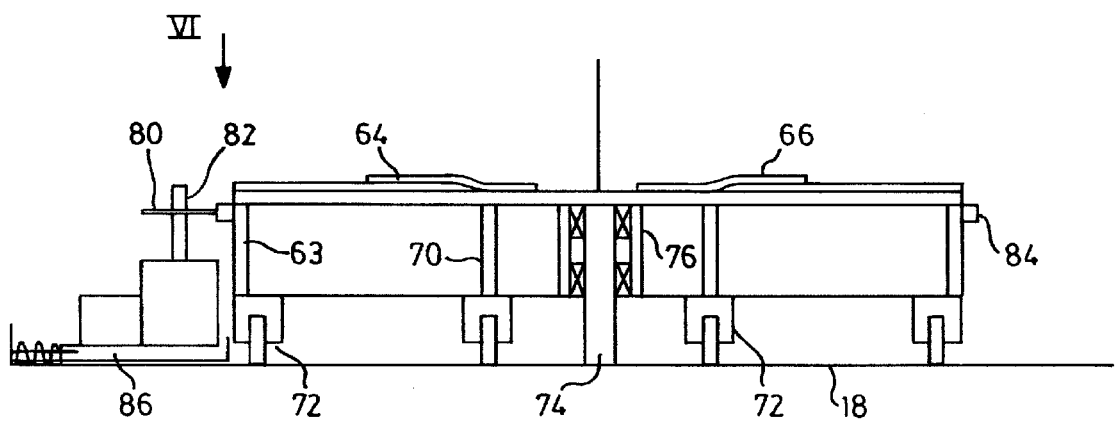
FIG. 5 is an enlarged view of a portion of the lighting stage shown in FIG. 1.
Figure 6:
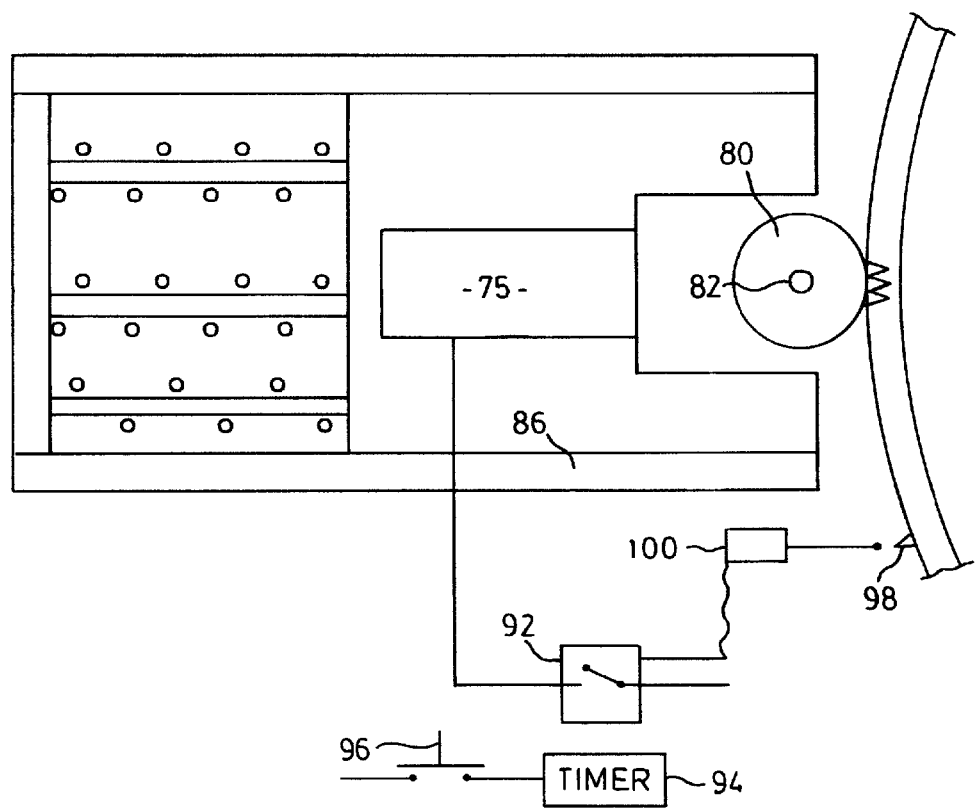
FIG. 6 is a plan-view of a portion of FIG. 5 in the direction of arrow VI.

Referring again to FIG. 2, the upper surface 22 of the turntable 20 presents a generally planar support surface and is subdivided into areas of contrasting reflectivity. A central reflective band 60 extends across the upper surface 22 and is flanked by a pair of absorbent sectors 62. The reflective band 60 is provided by a white flat reflective paint and the absorbent sectors 62 are provided by a flat black paint similar to that used as coating 48. The extent of the central band 60 may be adjusted by utilizing a pair of covering strips 64,66, shown in FIG. 5, which are made from an absorbent cloth material similar to that used on the covering 50. The lateral spacing between the strip 66 can be adjusted to reduce the width of the reflective central band 60 as will be described more fully below.

The upper surface 22 of the turntable 20 is supported on a circular frame 68 with additional strengthening members 70. The frame 68 and strengthening members 70 are supported upon wheels 72 distributed about the turntable that roll on the floor 18. The turntable 20 is located relative to the floor 18 by a centre spindle 74 that carriers bearings 76 at its upper end to rotatably support the structure 68,70 and upper surface 28. The turntable 20 is thus able to rotate about the spindle 74.

Rotation of the turntable 20 is controlled by a motor 78 that drives a sprocket 80 mounted on the drive shaft 82. The sprocket 80 engages a chain 84 secured to the circular frame 68, The sprocket 80 is free to slide on the spindle 82 but is keyed to rotate with the spindle so that it may accommodate vertical displacement of the turntable as it rotates. The motor 78 is itself mounted on a plate 86 within a frame 88 so it may slide radially relative to the spindle 74. The plate 86 is slideably mounted upon rods 88 with springs 90 biasing the plate 86 toward the spindle 74. The sprocket 80 is thus biased into engagement with the chain 84 but its mounting assembly may accommodate radial run-out whilst maintaining driving engagement.

Control for the motor 78 is provided through a switch 92 that in turn is controlled by a timer 94 that maintains the switch closed for a predetermined interval after closing of a start switch 96. An abutment 98 is secured to the frame 68 and engages a trip switch 100 that operates upon the switch 92 to stop the turntable 20 at a home position.

In operation the object 24, in this case a motor vehicle, is driven on to the turntable 20 through the use of suitable inclined ramps (not shown) and is centrally positioned on the turntable 20 in alignment with the band 60. The exact location of the vehicle on the turntable is carefully measured to ensure that it is centrally located over the axis of rotation 30. Similarly, the camera 40 is carefully aligned so that its focal axis is centered on the axis of rotation 30. The careful positioning of the vehicle and camera ensure that there is no orbital movement of the vehicle as the turntable rotates.

The reflective band 60 provides "uplighting" for the downwardly directed surfaces of the vehicle 24. The degree of uplighting can be adjusted by movement of the strips 64,66 toward or away from the vehicle until the most desirable highlighting is obtained. The exact position of the strips 64,66 will depend to a certain extent upon the outer shape of the vehicle. The lights 34 are also positioned to provide a uniform reflected and diffuse lighting from the ceiling 28 so that the highlights on the upper surface of the car are properly displayed. The cove 32 ensures hat there is a uniform distribution of the light without a line caused by a hard edge being reflected in the body of the vehicle. Similarly, the uniform spacing of the wall 28 from the turntable 20 on the opposite side of the turntable to the camera 40 provides a uniform distribution of light about the vehicle. The lower portion 46 of the peripheral wall 26 absorbs incident light and inhibits the appearance of reflections in the outer surface of the vehicle. In this regard, the pile material 50 is found to be most effective at preventing significant reflection on to the vehicle, whereas in critical locations the paint 48 may cause such a reflection. However, the paint 48 is sufficiently effective in the lateral portions of the walls 36.

The provision of the well 58 ensures that the black horizon does not appear through the windows of the vehicle as it rotates, which might otherwise cause post-production difficulties in processing the pictures for use on a web site or in advertising material. The gradually inclined edge 56 does, however, provide a progressive increase in the absorption of the light as the walls encompass the vehicle and provide the optimum diffusion and absorption of the light around the vehicle.

To initiate a photographic session, the turntable 22 is positioned in the home position and the shutters 42 positioned so as to obscure the camera operators and leave only a line of sight for the lens. The lights 34 are bounce flash units driven by suitable controls initiated from the camera 40 and effective to provide a short burst of high intensity light. The outer surface of the lights is black and a shroud may be provided over the rear surface of the light to inhibit reflection on the vehicle or into the field of vision of the camera.

With the turntable 20 positioned at the home position, an initial exposure of the vehicle is made and stored as a digital image on a computer. The start button 96 is pressed and the timer 94 operates the motor 78 to rotate the turntable for a short interval. It has been found that an interval sufficient to rotate the turntable approximately 10°, thereby giving thirty-six different positions of the vehicle relative to the camera has proven satisfactory for subsequent display of the vehicle on a computer in a rotating fashion. With the vehicle incrementally rotated, the next photograph is taken and stored as a computer file and the turntable further incremented. This sequence continues until the turntable again reaches the home position causing the stop 98 to trip the switch 100 and inhibit flirter movement. At each increment, a photograph is taken and stored on the computer. Upon completion of the set of photographs, the turntable 20 is rotated through 180 degrees from the home position enabling the vehicle to be driven off the turntable, down the ramps and out of the studio building 12.

The set of photographs are then forwarded for post-production editing through a suitable program such as that available from Adobe Photoshop™ and prepared as a file for display on an internet web site or similar advertising medium.

The provision of the curved circular ceiling 28 ensures a uniform dispersion of the light from the light assembly 34 with adjustment of the uplighting available through the adjustment of the strips 64,66. The uniform nature of the ceiling 28 and the peripheral wall 26 ensures that the highlighting of the vehicle remains constant during its rotation producing a pleasing overall effect when the photographs are assembled as a set and displayed sequentially to simulate rotation.

In a typical installation, by way of example only, the diameter of the turntable 20 is 24 ft., the height of the ceiling 28 above the turntable is 15 ft. and the diameter of the outer edge of the cove 54 where it meets the peripheral wall 26 is 54 ft. Other dimensions may of course be used to suit particular circumstances.

Figure 7:
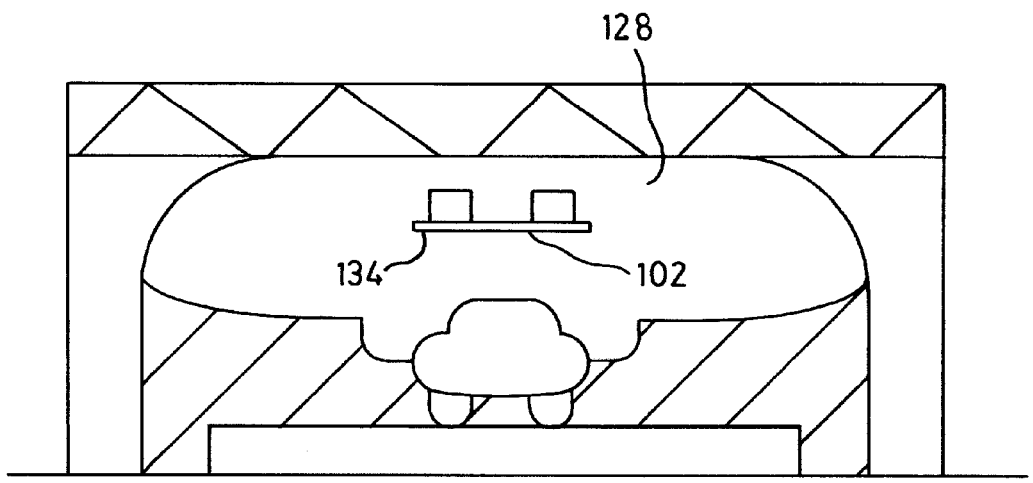
FIG. 7 is a view similar to FIG. 1 of an alternative embodiment of lighting stage and FIG. 8 is a representation of a further modification of the lighting stage shown in FIG. 1.

An alternative arrangement is shown in FIG. 7 in which the free standing lights 34 are replaced with a elevated set of lights 134 mounted adjacent to the ceiling 128. The lights 134 are supported on an opaque platform and the light is projected upwardly on to the under surface of the ceiling 128 for diffusion on the vehicle.

Figure 8:
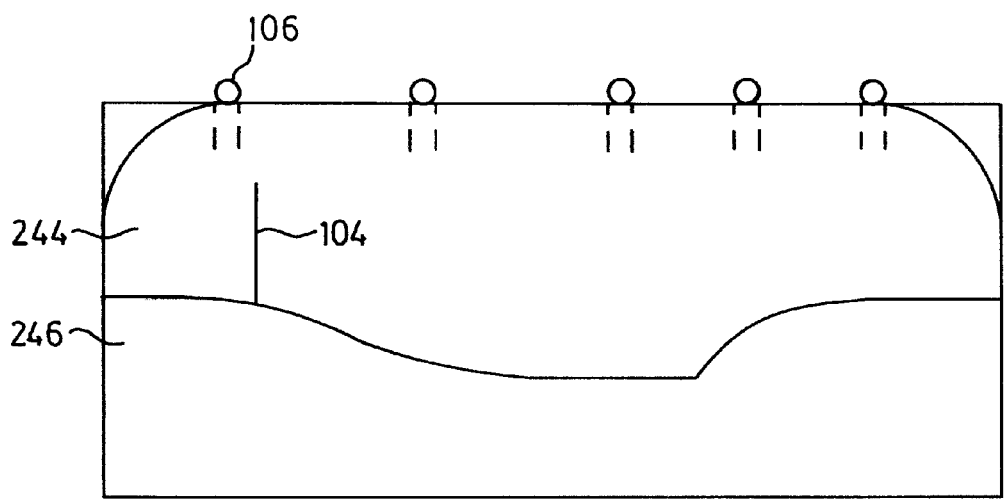

In a further embodiment illustrated in FIG. 8, the demarcation between upper and lower portions 244,246 is adjustable by forming the lower portion out of a fabric that may be elevated through guidewires over pulleys to adjust the position and inclination of the horizon provided by the demarcation between the upper and lower portions.

The embodiments of the invention in which an exclusive property or privilege is claimed are defined as follows:

1. A lighting stage comprising a floor, a turntable located on said floor and operable to rotate about a substantially vertical axis, said turntable having an upper surface to support an object thereon, a ceiling juxtaposed with and spaced from said upper surface, said ceiling having a downwardly directed reflective surface extending laterally beyond said turntable, a peripheral wall extending from said ceiling to encompass at least a portion of said turntable, said peripheral wall having an upper reflective portion and a lower absorbent portion, said upper portion and ceiling smoothly merging to provide a continuously curved cove to provide a transition between said ceiling and peripheral wall and a lighting assembly to project light on to said ceiling, said ceiling and upper portion reflecting and diff-using light toward said upper surface of said turntable to illuminate an object thereon.

2. A lighting stage according to claim 1 wherein said peripheral wall is uniformly spaced from said vertical axis over said portion of said turntable.

3. A lighting stage according to claim 1 wherein the height of the junction between said upper portion and lower portion varies about said turntable.

4. A lighting stage according to claim 3 wherein said height is a minimum in a sector on the opposite side of said turntable to a camera station.

5. A lighting stage according to claim 3 wherein a sector of said lower portion is clad in an absorbent material.

6. A lighting stage according to claim 5 wherein the balance of said lower portion is painted with an absorbent paint.

7. A lighting stage according to claim 1 wherein said ceiling is generally circular in plan and is centered on said vertical axis.

8. A lighting stage according to claim 7 wherein said cove is part spherical and is centered on the intersection of said vertical axis and said upper surface.

9. A lighting stage according to claim 1 wherein said upper surface has a central reflective portion upon which said object is located.

10. A lighting stage according to claim 9 wherein said upper surface has a non-reflective portion radially spaced from said central portion to inhibit reflection from the periphery of said upper portion.

11. A lighting stage according to claim 10 wherein said central portion is a band extending across said turntable and a pair of non-reflective segments are located on opposite sides of said band.

12. A lighting stage according to claim 10 including an adjustable covering to be placed on said upper surface and vary the reflective characteristics thereof.

13. A lighting stage according to claim 12 wherein said covering is absorbent and is configured to cover selected areas of said reflective portion.

14. A lighting stage accruing to claim 13 wherein said central portion is a band extending across said turntable and a pair of non-reflective segments on opposite sides of said band, said covering including a pair of absorbent strips for placement on said band to inhibit reflection therefrom.

15. A lighting stage according to claim 1 wherein said turntable includes a drive to rotate said turntable about said axis.

16. A lighting stage according to claim 15 including a control to rotate said turntable intermittently.

17. A lighting stage according to claim 16 wherein said control is responsive to said turntable passing a predetermined position.

\* \* \* \* \*